(12) United States Patent
Bergbauer, Jr. et al.

(10) Patent No.: US 11,694,274 B2
(45) Date of Patent: *Jul. 4, 2023

(54) PROCESSING SYSTEM TO FACILITATE MULTI-REGION RISK RELATIONSHIPS

(71) Applicant: Hartford Fire Insurance Company, Hartford, CT (US)

(72) Inventors: Alfred Edward Bergbauer, Jr., Kennett Square, PA (US); Kevin M Strong, Inver Grove Heights, MN (US); Venkata Uma Lakkakula, Rocky Hill, CT (US); Danielle Dubois, Plainville, CT (US); Kim Carina Ramelow, Brooklyn, NY (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 187 days.

This patent is subject to a terminal disclaimer.

(21) Appl. No.: 17/182,748

(22) Filed: Feb. 23, 2021

(65) Prior Publication Data

US 2021/0201422 A1 Jul. 1, 2021

Related U.S. Application Data

(63) Continuation of application No. 16/366,416, filed on Mar. 27, 2019, now Pat. No. 10,963,970.

(51) Int. Cl.
  *G06Q 10/10* (2023.01)
  *G06F 9/451* (2018.01)
  *G06Q 40/08* (2012.01)
  *G06Q 30/0204* (2023.01)

(52) U.S. Cl.
  CPC ............ *G06Q 40/08* (2013.01); *G06F 9/451* (2018.02); *G06Q 30/0205* (2013.01)

(58) Field of Classification Search
  CPC ..... G06Q 40/08; G06Q 30/0205; G06F 9/451
  USPC .......................................................... 705/4
  See application file for complete search history.

(56) References Cited

U.S. PATENT DOCUMENTS

| | | | |
|---|---|---|---|
| 2014/0304008 A1* | 10/2014 | Dorris | G06Q 40/08 705/4 |
| 2018/0260906 A1* | 9/2018 | Bonissone | G06Q 10/10 |

* cited by examiner

*Primary Examiner* — Hai Tran
(74) *Attorney, Agent, or Firm* — Buckley, Maschoff & Talwalkar LLC

(57) ABSTRACT

A multi-region risk relationship data store may contain electronic records representing a plurality of multi-region risk relationships and, for each multi-region risk relationship, an electronic record identifier and a set of multi-region attribute values including a plurality of hierarchical local risk relationship attribute values. A back-end application computer server may receive an indication of a selected risk relationship and display at least some of the associated multi-region attribute values. The server may receive adjustments to some of the multi-region or local risk-relationship attribute values, and displayed information may be automatically and dynamically configured based on the received adjustments and a standalone risk calculation unit. At least some local risk relationship attribute values may be replicated for multiple regions. When adjustments have been completed, the server may automatically assemble a multi-region risk relationship document.

20 Claims, 24 Drawing Sheets

MULTI-REGION RISK RELATIONSHIPS    _ □ ×

GLOBAL UNDERWRITING TOOL

Program Summary

COMPANY A INCORPORATED    ACCOUNT NUMBER: 123456789

Policy Details

| Master Policy Number | Group Number | Country | Coverage | LAP Number | Premium |
|---|---|---|---|---|---|
| 987654 | | | | | |
| | | USA | Property | | $1,000.00 |
| | | | ER | | $100.00 |
| | | | KRE | | $100.00 |
| | FOB1 | Algeria | BTA | | $100.00 |
| | | China | Auto | | $100.00 |
| | | France | Property | | $100.00 |
| | FOB2 | United Kingdom | Auto | | $100.00 |

MULTI-REGION RISK RELATIONSHIPS

GLOBAL UNDERWRITING TOOL

| PROGRAM | EXPOSURE | RATING | POLICY | FORMS | SUMMARY | PREPARATION |

COMPANY A INCORPORATED          ACCOUNT NUMBER: 123456789 — 1110

| Program Number | 1120 | Program Status | 1128 |
| SIC Code | 1122 | Program Type | 1130 |
| Insured Name | 1140 | Agency | 1148 |
| Address | 1142 | Agency Code | 1150 |
| Account Manager | 1160 | Regional Office | 1164 |

Description 1128
Coverage Info 1130
Contact 1148
Underwriter 1150
Countries 1164

(UPDATE) (RESET) (BACK) — 1170

MULTI-REGION RISK RELATIONSHIPS

GLOBAL UNDERWRITING TOOL

| PROGRAM | EXPOSURE | RATING | POLICY | FORMS | SUMMARY | PREPARATION |

COMPANY A INCORPORATED  ACCOUNT NUMBER: 123456789  — 1410

Master Country [1420]   Policy Type [1424]   Master Number [1428]

Coverages [1422]   Local Required? [1426]   Dates [1430]

Insured Name [1440]   Agency [1444]   Contact [1448]

Address [1442]   Tax Identifier [1446]   Form [1450]

Currency [1460]   Exchange Rate [1462]   Premium [1464]

( SAVE )   ( LAP )   ( RESET ) — 1470

MULTI-REGION RISK RELATIONSHIPS

GLOBAL UNDERWRITING TOOL

| PROGRAM | EXPOSURE | RATING | POLICY | FORMS | SUMMARY | PREPARATION |

| Subject | EDCN | Version | Document Type | Status | Published By | Date |
|---|---|---|---|---|---|---|
| NEW MATTER | 10235978130571 | 1.1 | CMP Quote | draft | Ms. Jones | 01-01-2022 |

— 1712

| Named Insured | Policy Number | Date | HQ State | SIC Code | Bill Type | Commission |
|---|---|---|---|---|---|---|
| COMPANY A | 12345676 | | CA | | direct | 10% |

— 1714

| Coverage | Class Code | Limit of Insurance | Exposure | Rate | Premium Base | New Premium |
|---|---|---|---|---|---|---|
| Property<br>Kidnap, Ransom, Ext...<br>Business Travel Accident | 1234 | $500,000 | | | | $2,000 |

MULTI-REGION RISK RELATIONSHIPS

GLOBAL UNDERWRITING TOOL

| PROGRAM | EXPOSURE | RATING | POLICY | FORMS | SUMMARY | PREPARATION |

| Subject | EDCN | Version | Document Type | Status | Published By | Date |
| NEW MATTER | 10235978130571 | 1.1 | CMP Quote | draft | Ms. Jones | 01-01-2022 | — 1722

ACCOUNT INFORMATION

Account Number: 12345566
Effective Date:
Expiration Date:
Agent:
Underwriter:
SIC Code
Master Policy Number: 8932234
Commission Percent: 10
⎤— 1724

ALGERIA

Policy Indicator:        Insured Name: COMPANY A
Country Code:            Insured Address:
Program:                 Insured City:
Policy Number:           Insured State:
Network Partner:         Insured Postal Code:
Billing Method:          Insured Country: USA
Claim Made/Occurrence    Renewal/New: New
Gross Premium:           Broker Code: B123
Coverage Part
Limits:

GL    ER
New   New

MULTI-REGION RISK RELATIONSHIPS

GLOBAL UNDERWRITING TOOL

| PROGRAM | EXPOSURE | RATING | POLICY | FORMS | SUMMARY | PREPARATION |
|---------|----------|--------|--------|-------|---------|-------------|

| Policy Number | Group Number | Country | Coverage | Named Insured | | Dates |
|---------------|--------------|---------|----------|---------------|---|-------|
| P123456 | LAP1 | Algeria | GL | COMPANY A | | |
| P987654 | LAP2 | China | Property | COMPANY A | | |
| P246801 | LAP3 | USA | GL | COMPANY A | | |
| P918273 | FOS1 | Belgium | ER | COMPANY A | | |
| P546372 | FOS1 | UK | Auto | COMPANY A | | |
| P283746 | FOS1 | Ireland | ER | COMPANY A | | |

| MASTER POLICY ID 2102 | CUSTOMER NAME 2104 | LOCAL POLICIES 2106 | FINAL DOCUMENT 2108 | ... | MULTI-REGION PREMIUM VALUE 2110 |
|---|---|---|---|---|---|
| M_10001 | ABC CORP | LP1, LP2, LP3 | DOC1.DOC | ... | $50,000.00 |
| M_10002 | XYZ INC. | LP1.1, LP1.2, LP1.3 | DOC2.TXT | ... | $27,000.00 |
| M_10003 | AMERICAN PRODUCTS | LP9, LP8, LP1 | link | ... | $35,000.00 |
| M_10004 | DR. JONES PEDIATRIC | NONE | www.doc.com/doc1 | ... | $5,000.00 |

PROCESSING SYSTEM TO FACILITATE MULTI-REGION RISK RELATIONSHIPS

CROSS-REFERENCE TO RELATED APPLICATIONS

The present application is a continuation of U.S. patent application Ser. No. 16/366,416 entitled "PROCESSING SYSTEM TO FACILITATE MULTI-REGION RISK RELATIONSHIPS" and filed on Mar. 27, 2019. The entire content of that application is incorporated herein by reference.

BACKGROUND

An enterprise might enter into a risk relationship with an entity (e.g., as a form of risk management) and the relationship may include agreements covering multiple regions (e.g., various countries). In some cases, the enterprise may want to accurately populate and/or adjust the content of one or more electronic records that represent those agreements. For example, more accurate electronic records may improve the performance of the enterprise by reducing errors (and the need to re-enter information). Note that improving the accuracy of electronic records may result in substantial improvements to the operation of a network (e.g., by reducing an overall number of electronic messages that need to be created and transmitted via various networks). Manually updating electronic records and associated documents, however, can be time consuming and expensive—especially when a substantial number of electronic records (e.g., associated with a large number of countries) and/or a wide range of different types of information that needs to be tracked In some cases, a multi-national risk relationship enterprise might use macro-based spreadsheet application toolkits to quote and price multi-region agreements. Such an approach, however, can require excessive and repetitive manual input, miss key business functionalities, and allow for minimal or no system integration to help combine and/or cleanse the data.

It would be desirable to provide systems and methods to facilitate the creation of multi-region electronic record information in a way that provides faster, more accurate results.

SUMMARY OF THE INVENTION

According to some embodiments, systems, methods, apparatus, computer program code and means are provided to facilitate the creation of multi-region electronic record information in a way that provides faster, more accurate results and that allow for flexibility and effectiveness when generating documents that utilize those results. In some embodiments, a multi-region risk relationship data store may contain electronic records representing a plurality of multi-region risk relationships and, for each multi-region risk relationship, an electronic record identifier and a set of multi-region attribute values including a plurality of hierarchical local risk relationship attribute values. A back-end application computer server may receive an indication of a selected risk relationship and display at least some of the associated multi-region attribute values. The server may receive adjustments to some of the multi-region attribute values, and displayed information may be automatically and dynamically configured based on the received adjustments and a standalone risk calculation unit. When an adjusted attribute value differs from a multi-region attribute value by more than a threshold amount, a confirmation signal from a user device may be requested. When adjustments have been completed, the server may automatically assemble a multi-region risk relationship document.

Some embodiments comprise: means for accessing, by a back-end application computer server, a multi-region risk relationship data store containing electronic records representing a plurality of multi-region risk relationships with an enterprise and, for each multi-region risk relationship, an electronic record identifier and a set of multi-region attribute values including a plurality of hierarchical local risk relationship attribute values; means for receiving an indication of a selected risk relationship, between the enterprise and an entity, from the multi-region risk relationship data store, including the associated set of multi-region attribute values; means for arranging to display at least some of the multi-region attribute values on an interactive user interface display; means for receiving, from a remote user device, adjustments to at least some of the multi-region attribute values, wherein the information on the interactive user interface display is automatically and dynamically configured based on the received adjustments and a standalone risk calculation unit; means for arranging for at least some local risk relationship attribute values to be automatically replicated for multiple regions; means for receiving, from the remote user device, an indication that adjustments to multi-region attribute values have been completed; means for, responsive to the received indication, automatically assembling a multi-region risk relationship document; and means for transmitting an indication of the assembled multi-region risk relationship document to the remote user device.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to facilitate the creation of multi-region electronic record information in a way that provides faster, more accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 10 is a program summary display in accordance with some embodiments.

FIG. 11 is a program setup display according to some embodiments.

FIG. 14 is a policy information display in accordance with some embodiments.

FIGS. 17A through 17C are final policy preparation displays according to some embodiments.

FIG. 21 is a portion of a tabular multi-region risk relationship database according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record attribute update and/or analysis by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately improve the exchange of information, thus improving the overall efficiency of the system associated with message storage requirements and/or bandwidth considerations (e.g., by reducing the number of messages that need to be transmitted via a network and/or by creating more complete and/or accurate documents). Moreover, embodiments associated with collecting accurate information might further improve risk values, predictions of risk values, allocations of resources, electronic record processing decisions, etc.

Figure 1:
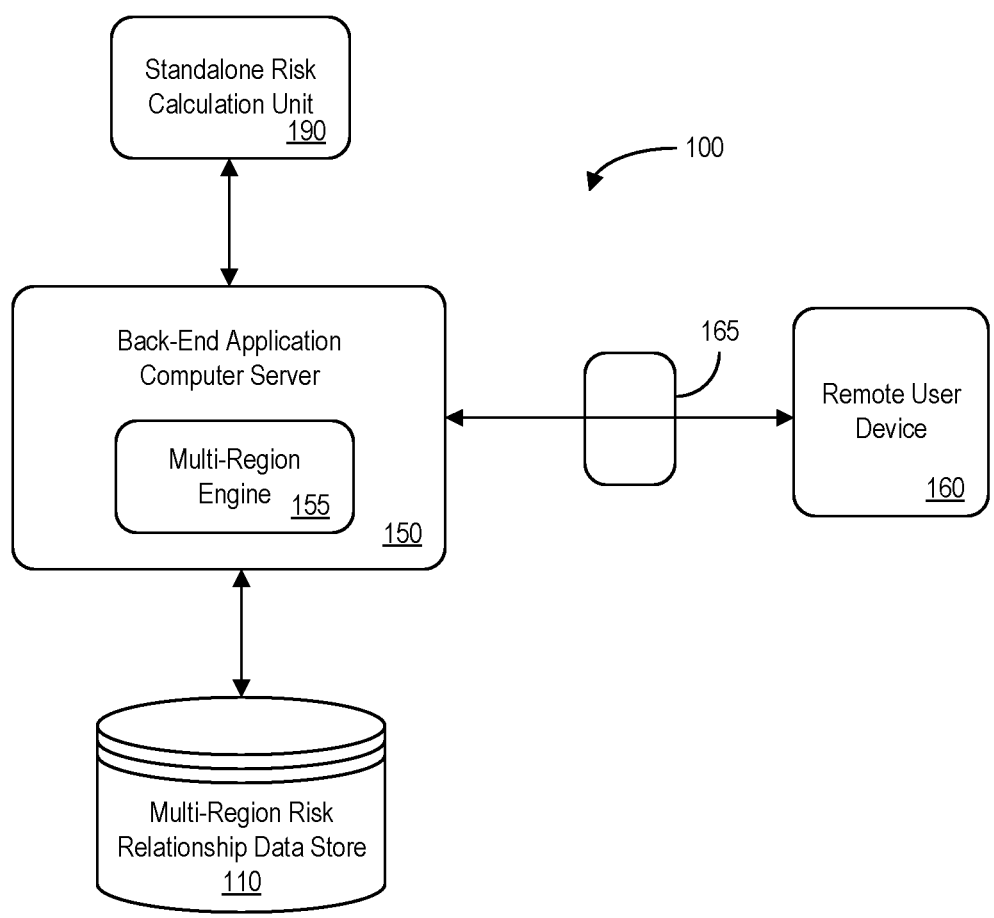
FIG. 1 is a high-level block diagram of a system in accordance with some embodiments.

In some cases, a resource value associated with an enterprise system may depend at least in part on attribute values of electronic records representing a plurality of multi-region risk associations with the enterprise system. For example, the resource value might tend to increase when a specific type of attribute value increases (or decrease when another type of attribute value increases). Manually entering information to update attribute values by an enterprise, however, can be a time consuming and error prone process, especially when a substantial number of electronic records and/or attribute variables may influence the behavior of the system. To address this issue, FIG. 1 is a high-level block diagram of a system 100 according to some embodiments of the present invention. In particular, the system 100 includes a back-end application computer 150 server that may access information in a multi-region risk relationship data store 110 (e.g., storing a set of electronic records representing risk associations, each record including, for example, one or more risk relationship identifiers, attribute variables, resource values, etc.). The back-end application computer server 150 may also retrieve information from other data stores or sources in connection with a multi-region engine 155 to verify and/or update the electronic records. The back-end application computer server 150 may also exchange information with a remote user device 160 (e.g., via a firewall 165). According to some embodiments, an interactive graphical user interface platform of the back-end application computer server 150 (and, in some cases, third-party data) may facilitate document creation, decisions, predictions, and/or the display of results via one or more remote administrator computers (e.g., to gather additional information about a multi-region association) and/or the remote user device 160. For example, the remote user device 160 may transmit updated information to the back-end application computer server 150. Based on the updated information, the back-end application computer server 150 may adjust data in the multi-region risk relationship data store 110 and automatically create a new risk relationship document. Note that the back-end application computer server 150 and/or any of the other devices and methods described herein might be associated with a third party, such as a vendor that performs a service for an enterprise. According to some embodiments, the back-end application computer server 150 access a "standalone" risk calculation unit 190 when processing a risk relationship (e.g., a unit that is independent of the server). In this way, changes and updates can be made to the standalone risk calculation unit 190 without having to change other components of the system 100.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate updates of electronic records in the multi-region risk relationship data store 110. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the multi-region risk relationship data store 110. The multi-region risk relationship data store 110 might, for example, store electronic records representing a plurality of multi-region risk associations, each electronic record having a set of attribute values including a resource value. The multi-region risk relationship data store 110 may also contain information about prior and current interactions with parties, including those associated with the remote user devices 160. The multi-region risk relationship data store 110 may be locally stored or reside remote from the back-end application computer server 150. As will be described further below, the multi-region risk relationship data store 110 may be used by the back-end application computer server 150 in connection with an interactive user interface to update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and a document server might be co-located and/or may comprise a single apparatus.

Figure 2:
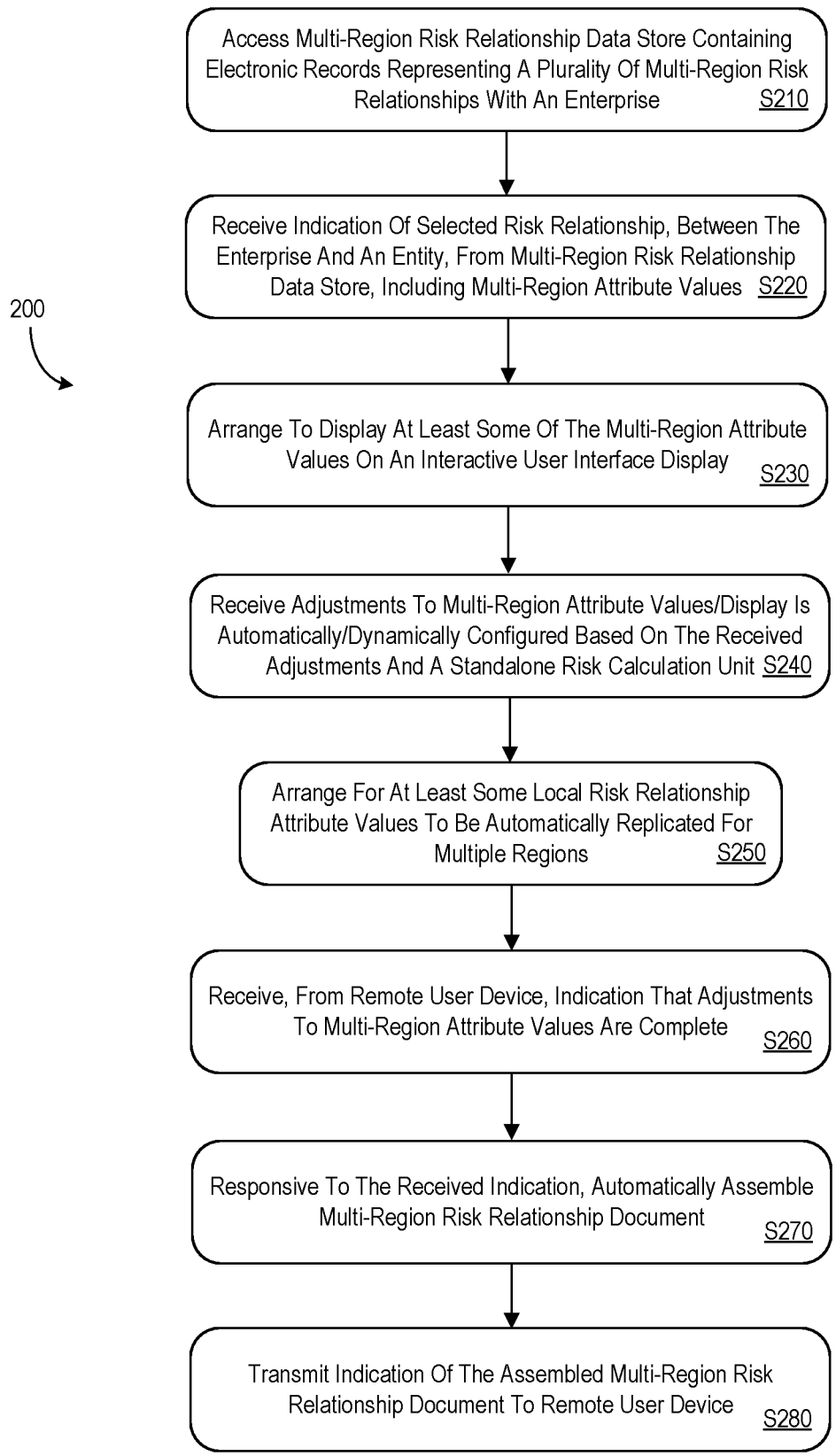
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Figure 4:
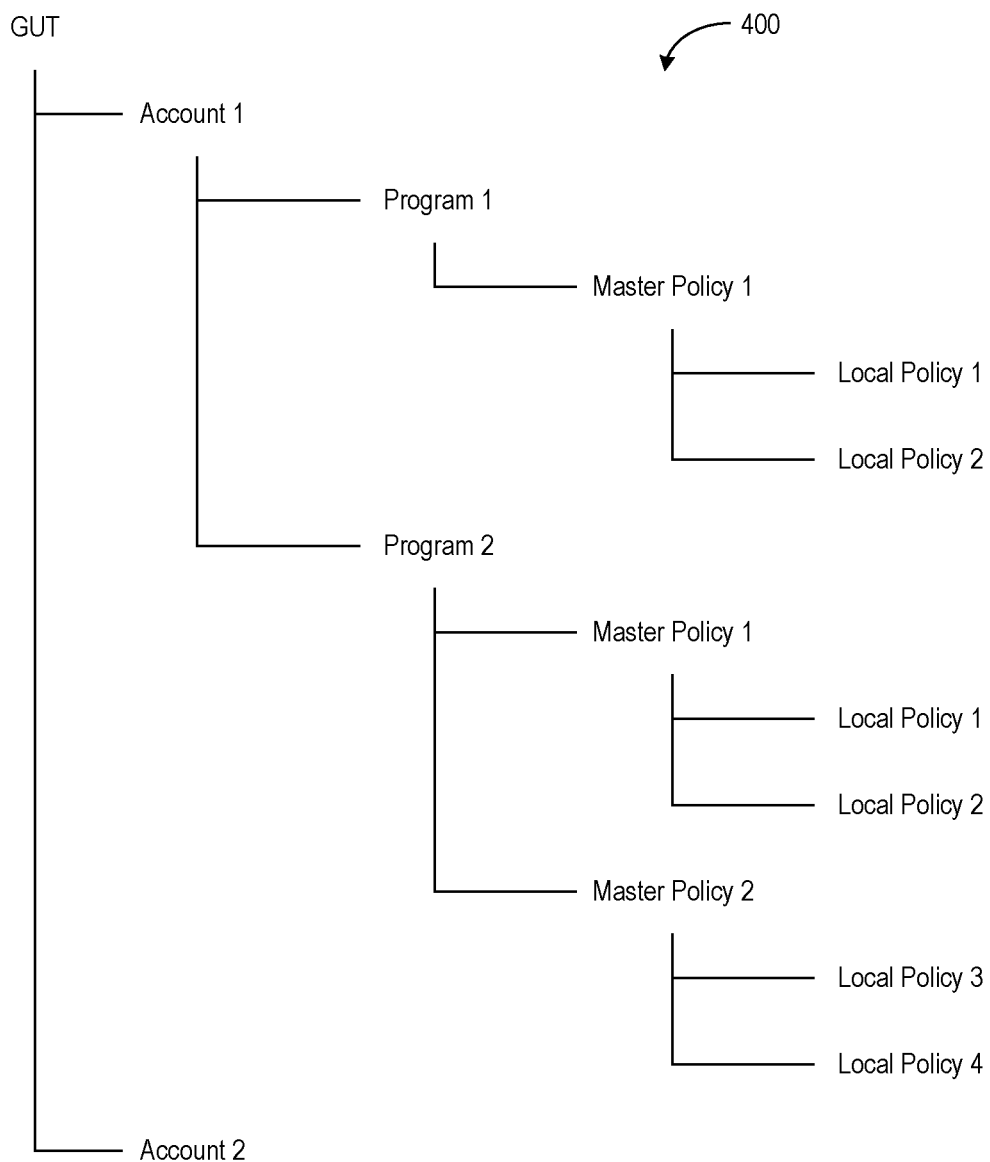
FIG. 4 is an example of a hierarchical tree elements in accordance with some embodiments.

At S210, a back-end application computer server may access a multi-region risk relationship data store containing electronic records representing a plurality of multi-region risk relationships with an enterprise and, for each multi-region risk relationship, an electronic record identifier and a set of multi-region attribute values including a plurality of hierarchical local risk relationship attribute values (described in detail with respect to FIG. 4). At S220, an indication of a selected risk relationship, between the enterprise and an entity, may be received from the multi-region risk relationship data store, including the associated set of multi-region attribute values.

At S230, at least some of the multi-region attribute values may be displayed on an interactive user interface display. For example, the display might be pre-populated with current attribute values and/or data provided in connection with another region or country. According to some embodiments, information from the multi-region risk relationship data store is supplemented third-party data, governmental data (e.g., from a department of motor vehicles, the Internal Revenue Service ("IRS"), a state tax department, etc.), document data (e.g., by automatically extracting a total number of employees, job descriptions, salary data, etc. from a document), credit score data, etc.

At S240, adjustments to at least some of the multi-region attribute values may be received from a remote user device. According to some embodiments, the information on the interactive user interface display is automatically and dynamically configured based on the received adjustments and a standalone risk calculation unit. The standalone risk calculation unit might, for example, execute equations and algorithms to determine appropriate premium values for a region.

At S250, the system may arrange for at least some local risk relationship attribute values to be automatically replicated for multiple regions. Such an approach may reduce the amount of manual work required to create risk relationships and reduce the amount of errors associated with repetitive data entry. At S260, an indication that adjustments to multi-region attribute values have been completed may be received from the remote user device. For example, an operator may select to "prepare" documentation for a risk relationship. At S270, and responsive to the received indication, the system may automatically assemble a multi-region risk relationship document (e.g., in accordance with at least one of the hierarchical local risk relationship attribute values). At S280, the system may transmit an indication of the assembled multi-region risk relationship document to the remote user device. The information might be transmitted, for example, via a web page, an email server, a text message, a calendar function, a workflow application, etc. According to some embodiments, the back-end application server may utilize a chatbot text interface, a streaming video interface, voice recognition, etc.

According to some embodiments, the back-end application computer server is further programmed to upload an attachment file from the remote user device. For example, the remote user device might upload an image file, a spreadsheet application, file, etc. in support of updates being made to an electronic record. In such cases, the back-end application computer server might supplement the information from the multi-region risk relationship data store with at least one value extracted from the attachment file (e.g., based on a cell label, an Optical Character Recognition ("OCR") process, etc.).

In some embodiments, a state of adjustments to multi-region attribute values for the selected risk relationship may be stored and later accessed by the user. For example, a user might update half of the multi-region attribute values via a web site and "save" the updates. The user may then leave the web site. When the user later returns to the web site, he or she may select to reload those changes (e.g., after entering a username and password) and process to update the other half of attribute values.

Figure 3:
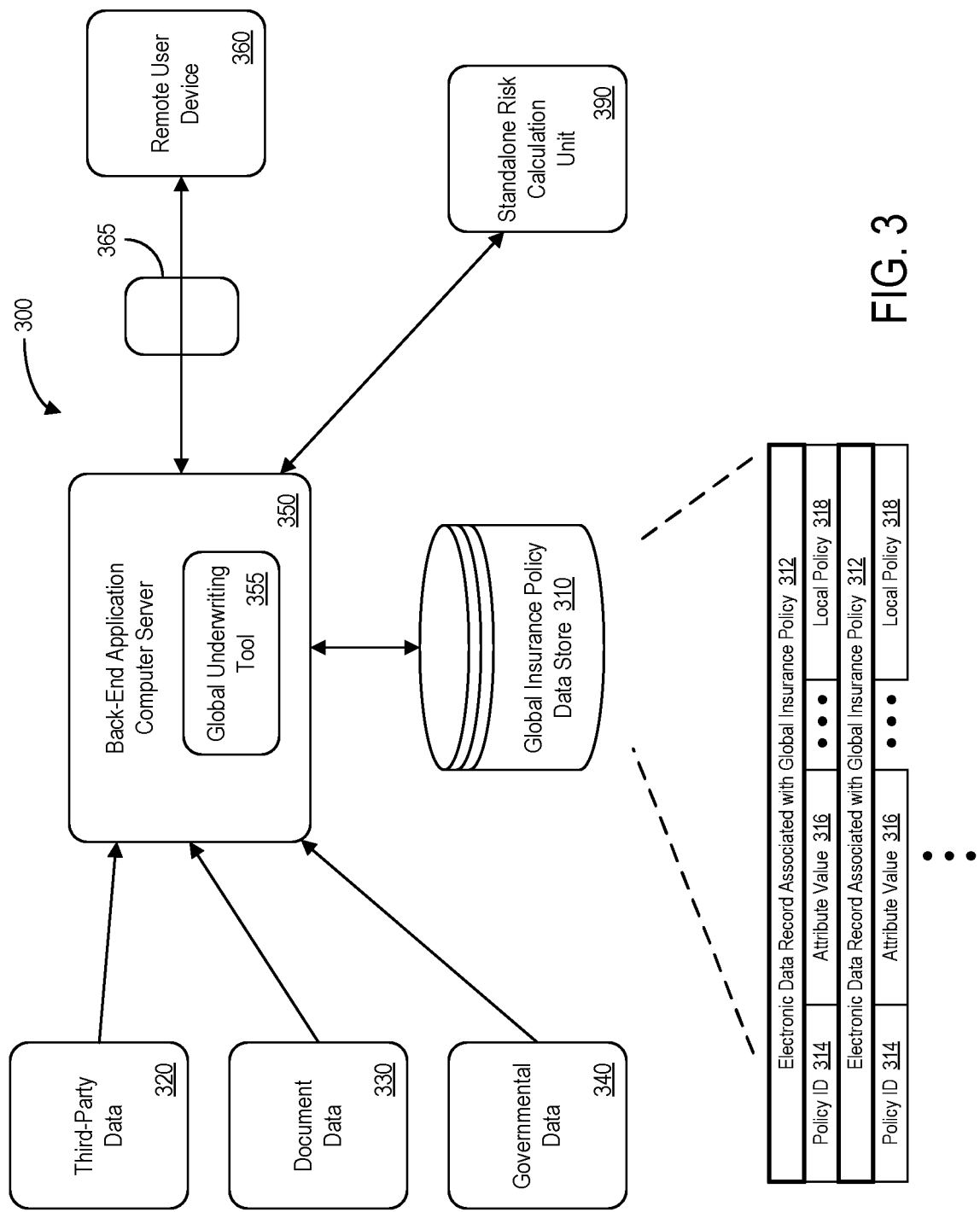
FIG. 3 is a more detailed block diagram of an insurance system according to some embodiments.

In this way, a system may let a user update electronic records associated with a multi-region risk relationship between with an enterprise. According to some embodiments, the multi-region "risk relationships" are associated with insurance policies and at least some multi-region resource values are associated with insurance premiums. For example, FIG. 3 is a more detailed block diagram of a system 300 according to some embodiments. As before, the system 300 includes a back-end application computer server 350 that may access information in a global insurance policy data store 310 (e.g., storing a set of electronic records 312 representing insurance policies, each record including, for example, one or more insurance policy identifiers 314, attribute variables 316, local insurance policies 318, etc.). The back-end application computer server 350 may also retrieve information from other data stores or sources in connection with a global underwriting tool 355 to verify and/or update the electronic records. The back-end application computer server 350 may also exchange information with a remote user device 360 (e.g., via a firewall 365). According to some embodiments, an interactive graphical user interface platform of the back-end application computer server may facilitate document creation, decisions, predictions, and/or the display of results via one or more remote administrator computers (e.g., to gather additional information about a multi-region association) and/or the remote user device 360.

According to some embodiments, the back-end application computer server 350 may also receive external information, such as third-party data 320, document data 330, and governmental data 340. This data might be used, for example, to pre-populate fields in a document creation process web site. A user may then review the information via the remote user device 360 and transmit updated information to the back-end application computer server 350. Based on the updated information, the back-end application computer server 350 may adjust data in the global insurance policy data store 310 and automatically generate appropriate documents based on information received from a standalone risk calculation unit 390. According to some embodiments, the back-end application computer server 350 may transmit information to an email server, workflow application, or calendar function (e.g., to generate reminders when an insurance policy renewal date approaches). Similarly, the back-end application computer server 350 might transmit updated electronic records 312 to an underwriter for manual review and a determination of a final insurance premium.

Note that embodiments may be associated with various types of multi-region insurance policies, including those associated with insurance for property, general liability, employer's responsibility, business travel accident, kidnap, ransom and extortion, automobile liability, marine, cyber-technology, etc.

In this way, an enterprise (e.g., an insurance provider) may help an entity (e.g., a business) protect employees wherever they venture. When employees journey abroad for business or temporary assignments, the insurer can cover them while they're going about their business, such as by participating in multinational exhibitions, trade fairs or conferences, sponsoring trips, tours or study groups abroad, performing service or repair work abroad, etc. The insurance coverage might extend protection that goes beyond business trips for companies that have no permanent employees, manufacturing plants, retail stores or other physical locations outside the U.S. Some types of claims might include, bodily injury and property damage, employee benefits liability, personal and advertising injury, medical payments, commercial, personal and miscellaneous property, business travel accidents, commercial auto liability, etc.

According to some embodiments, a Controlled Master Program ("CMP") may combine a multi-national master policy with one or more local admitted policies to provide a single, coordinated insurance program. The local admitted policies may be issued through partnerships with insurers in various regions. The local and master policies may have a "hierarchical" relationship. As used herein, the term "hierarchical" may refer to an arrangement of items (objects, elements, groups, insurance policies, etc.) in which the items are represented as being "above, "below," or "at the same level" with each other. For example, FIG. 4 is an example 400 of hierarchical tree elements in accordance with some embodiments. The example shows, for a Global Underwriting Tool ("GUT") a hierarchy including accounts, programs, master policies, and local insurance policies. Note that one program might have multiple packages, and each package has its own master policy. The master policy might be written, for example, in US for most cases and be associated with a particular program (note that a program might have one to many master policies). A Locally Admitted Policy ("LAP") may be written outside the US and might comprise:

a single policy (such that each LAP is associated with "one" coverage and "one" location);

a Freedom Of Service ("FOS") (such that the LAP is only applicable for European Region, and a LAP can be associated with "one" coverage and "multiple" locations; or a Difference In Coverage Difference In Limit ("DCDL").

Figure 5:
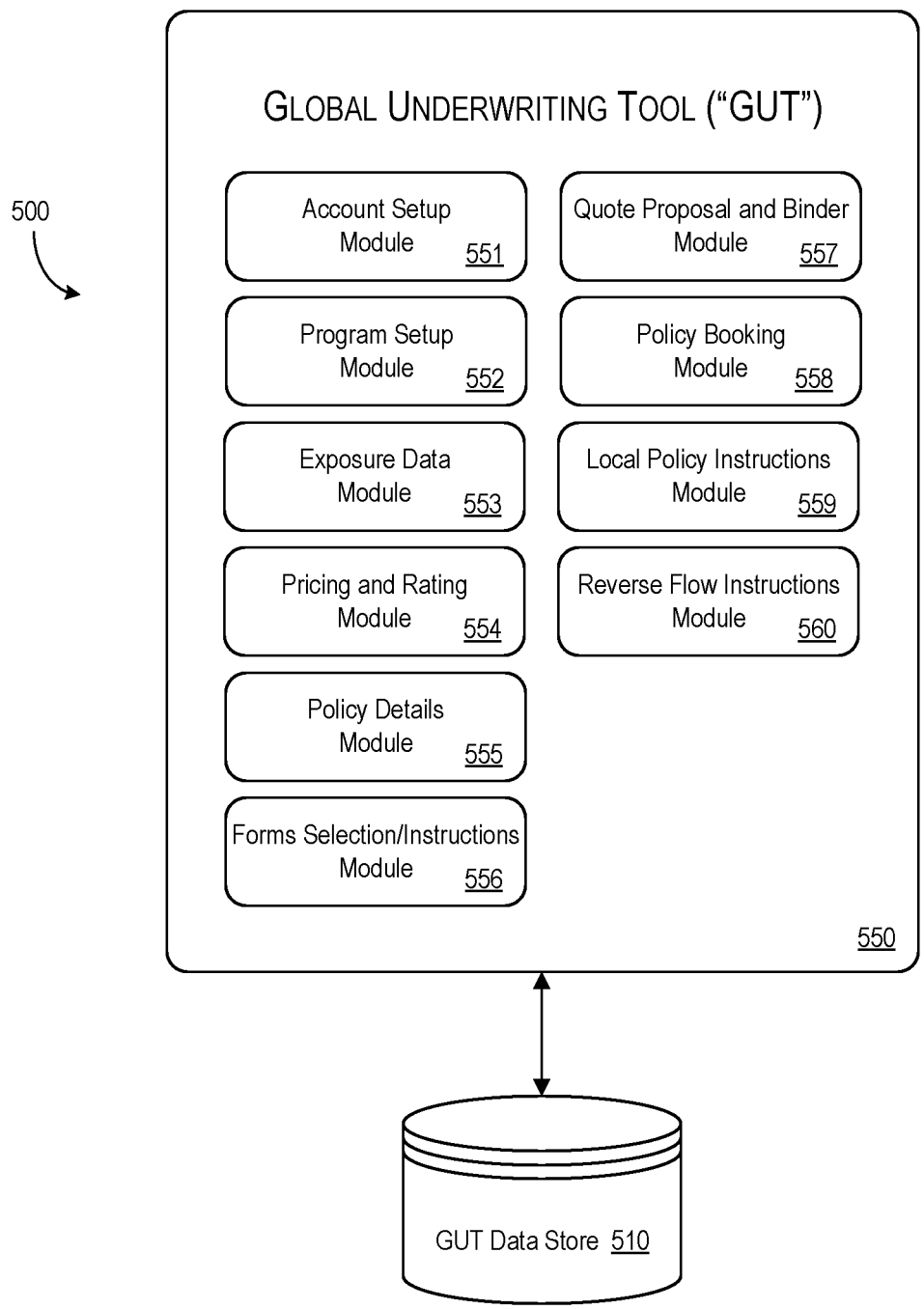
FIG. 5 is a global underwriting tool system according to some embodiments.

FIG. 5 is a global underwriting tool system 500 according to some embodiments. In particular, a GUT 550 exchanges information with a GUT data store 510. The GUT 550 might include, according to some embodiments, an account setup module 551, a program setup module 552, an exposure data module 553 (e.g., location details with exposure, GEO Coder, etc.), a pricing and rating module 554 (e.g., calculator, deficiency point, etc.), a policy details module 555 (e.g., for master and LAP policy), a forms selection and instructions module 556, a quote proposal and binder module 557 (e.g., for PDA service), a policy booking module (e.g., to assist with the entry of appropriate codes) 558, a local policy instructions module 559 (e.g., when a master US insurance policy requires instructions to be sent to foreign insurance partners requesting that local policies be established), a reverse flow instructions module 560 (e.g., when a master foreign insurance policy requests that a local US policy be established), etc.

Figure 6:
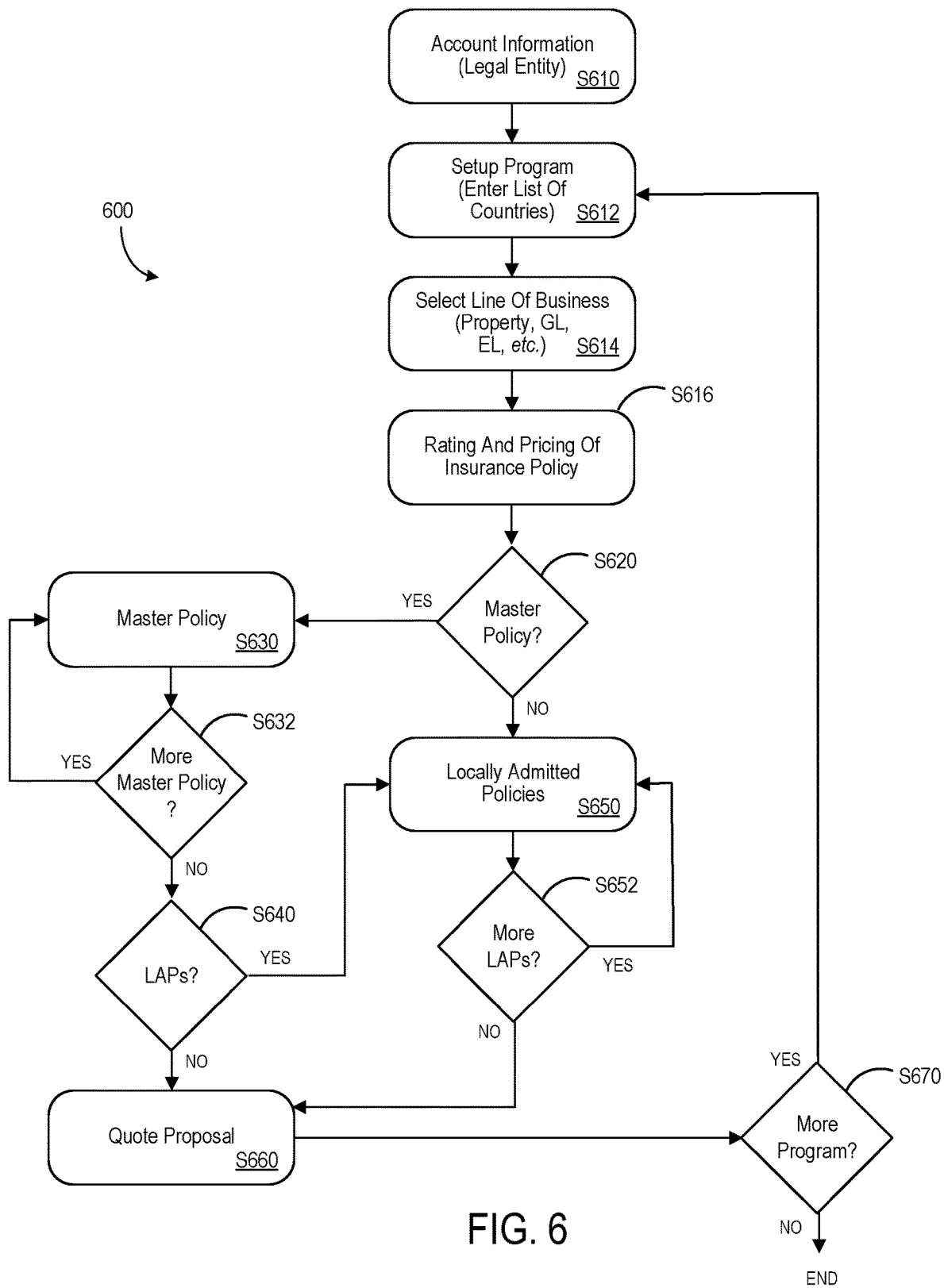
FIG. 6 is a process flow for a global underwriting tool in accordance with some embodiments.

FIG. 6 is a process flow 600 for a global underwriting tool in accordance with some embodiments. At S610, account information may be entered (e.g., legal entity) and a program may be setup at S612 (e.g., by entering a list of countries or regions). At S614, one or more lines of business may be selected (e.g., general liability, property, etc.). At S616, a rating and pricing of the insurance policy process may be executed (e.g., in accordance with the account information and list of countries or regions). If it is a master policy at S620, a master policy process is performed at S630 until there are no more master policies to process at S632. If there are no LAPs at S640, the system can quote the proposal at S660 and, if the program is complete at S670, the process 600 may end.

If there are LAPS at S640 (or the original program was not a master policy at S620), a locally admitted policies process is performed at S650 until all LAPs have been processed at S652. The system can quote the proposal at S660 and, if the program is complete at S670, the process 600 may end. If the program is not complete at S670, the method 600 continues at S612.

Figure 7:
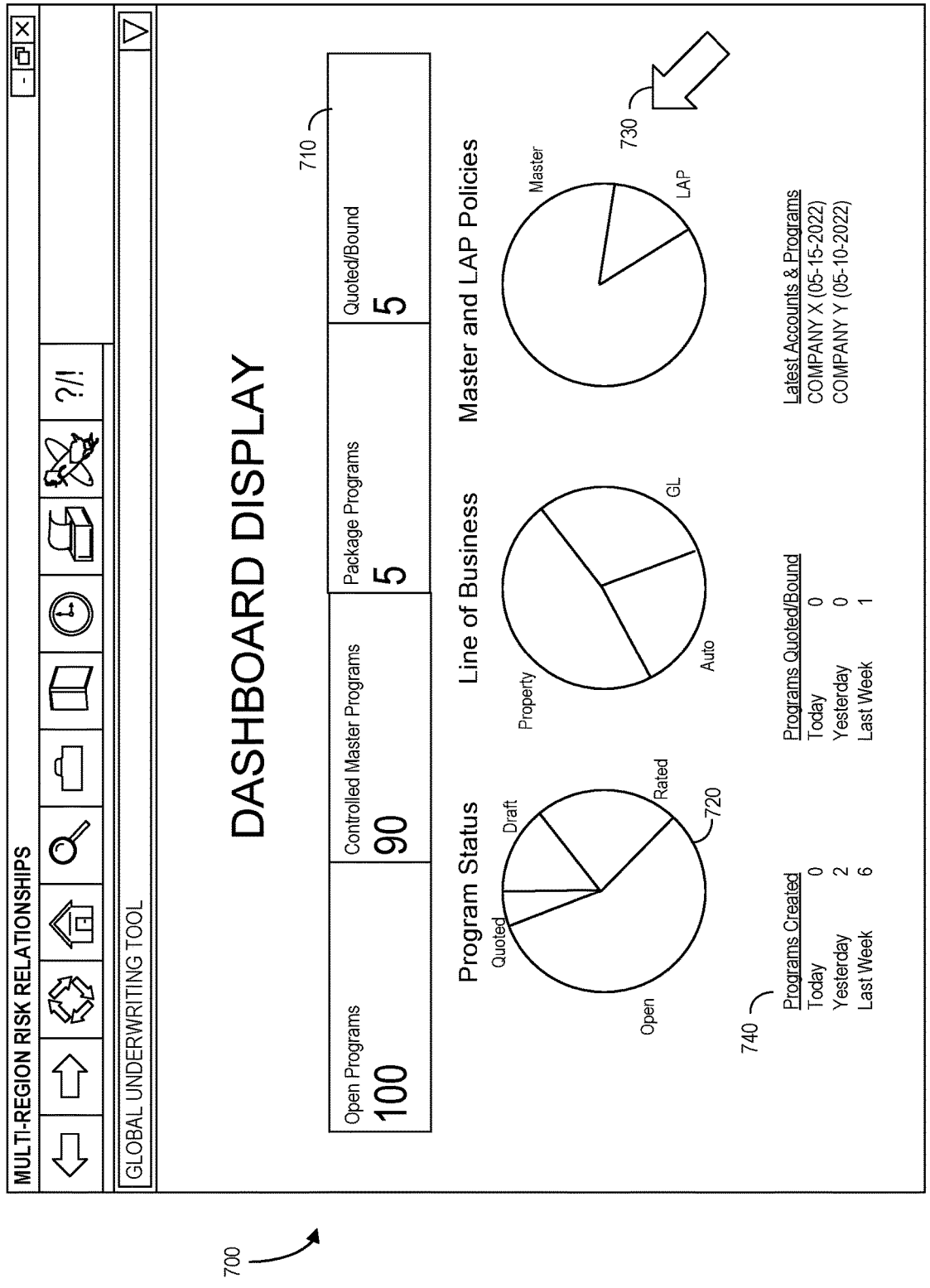
FIG. 7 is a graphical user interface dashboard display according to some embodiments.

FIG. 7 is a graphical user interface dashboard display 700 according to some embodiments. The display 700 includes indications 710 of open programs, CMPs, package programs, and Quoted/Bound programs. The display 700 further includes graphical representations 720 of program status, lines of business, and master and LAP insurance policies. Selection of elements on the display (e.g., via touchscreen or computer mouse pointer 730) may result in a popup window providing additional details about that element. Recent activity 740 may also be included on the display (e.g., how many programs were created during the last week?).

Figure 8:
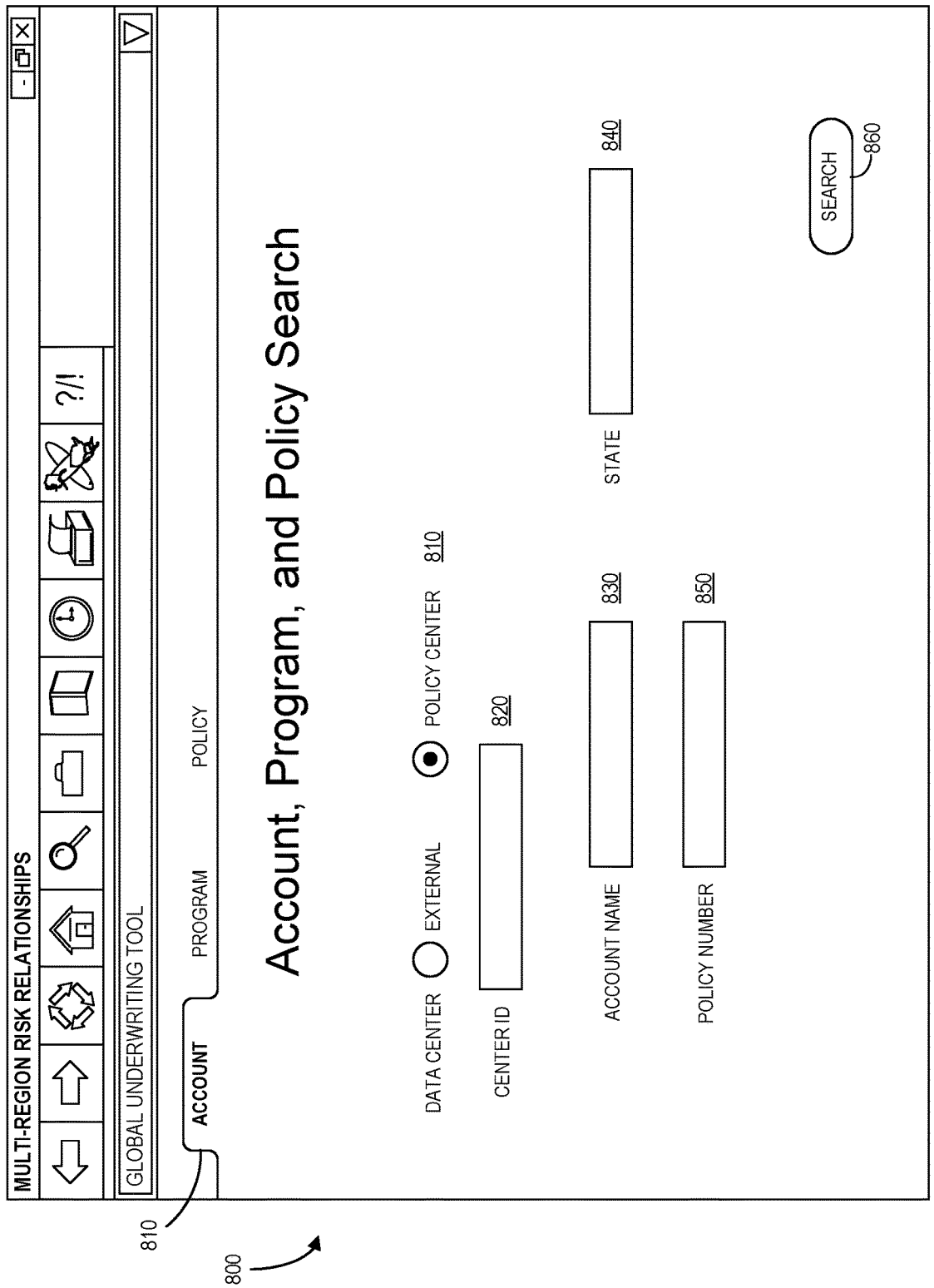
FIG. 8 is an account search display in accordance with some embodiments.
Figure 9:
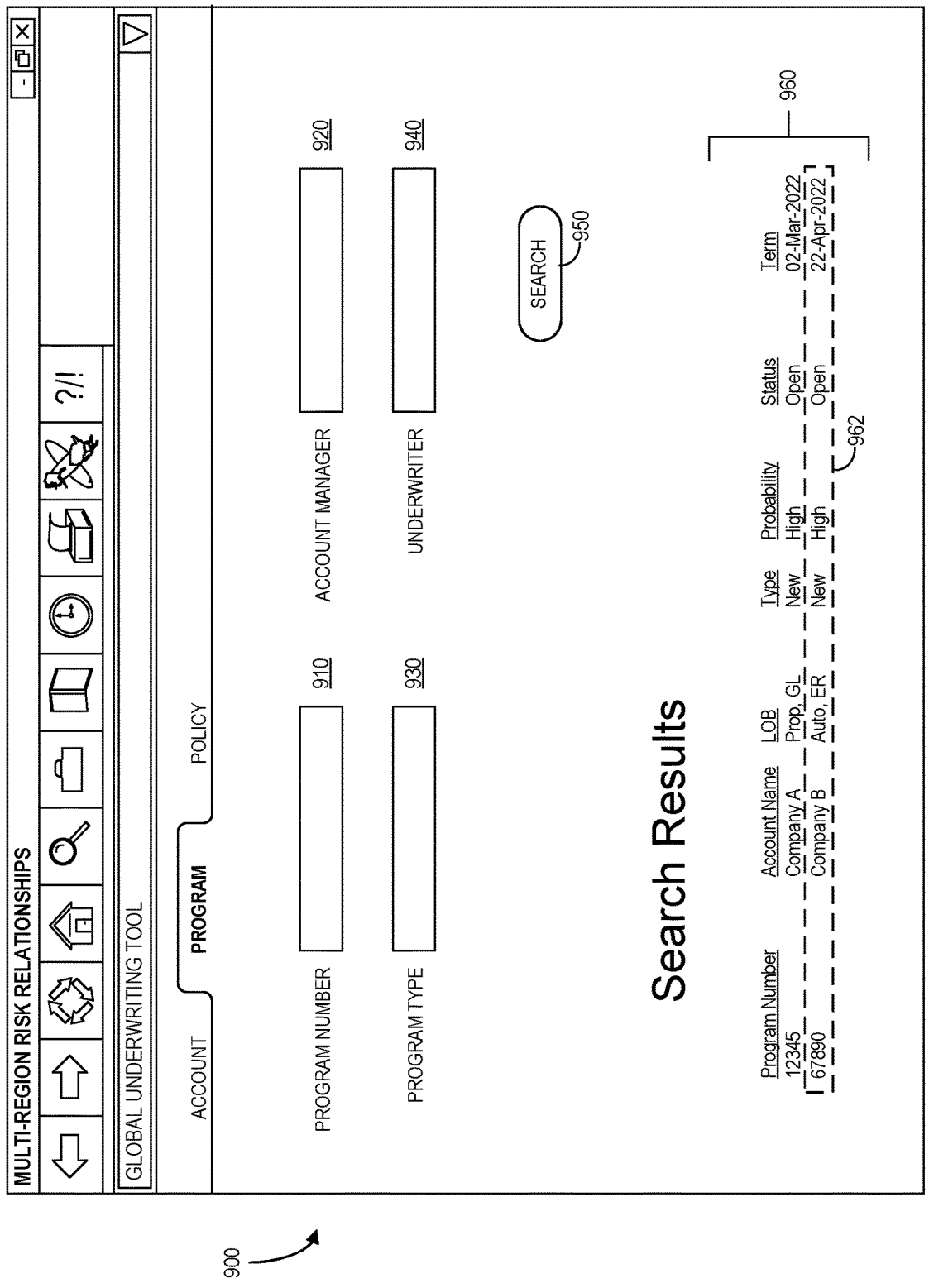
FIG. 9 is a program search display according to some embodiments.

FIG. 8 is an account search display 800 in accordance with some embodiments. Note that an operator might select 810 to search via account, program, or policy. In the account search display 800, a data center 810 might be selected (along with a center identifier 820) and an account name 830 or state 840 might be provided to perform a search 860. According to some embodiments, an operator might also search via a policy number 850. FIG. 9 is a program search display 900 according to some embodiments. In this case, an operator might search via a program number 910, an account manager 920, a program type 930, or an underwriter 940 by selecting a "Search" icon 950. The display 900 also includes search results 960 listing a program number, account name, line of business, etc. of matching records.

An operator might select one of the search results 960 (as indicated by the dashed box in FIG. 9) to see more information about that program. For example, FIG. 10 is a program summary display 1000 in accordance with some embodiments. The display 1000 includes a summary overview 1010 along with policy details 1020 (e.g., a master policy number, group number country, coverages, etc.).

FIG. 11 is a program setup display 1100 that may be used to initially create a new program according to some embodiments (e.g., by selecting a "Program" navigation tab 1105. The display 1100 includes a program overview 1110 along with a program identifier or number 1120, a program code 1122 (e.g., a Standard Industry Classification ("SIC") code), a program status 1124, a program type 1126, a description 1128, coverage information 1130, an insured name 1140 and address 1142, an agency 1144 and agency code 1146, a contact 1148, and an underwriter 1150. According to some embodiments, the display 1110 also includes an account manager 1160, a regional office 1162, a list of countries 1164, etc. An operator may select "Update," "Reset," "Back" icons 1170 to navigate to other portions of the global underwriting tool.

Figure 12:
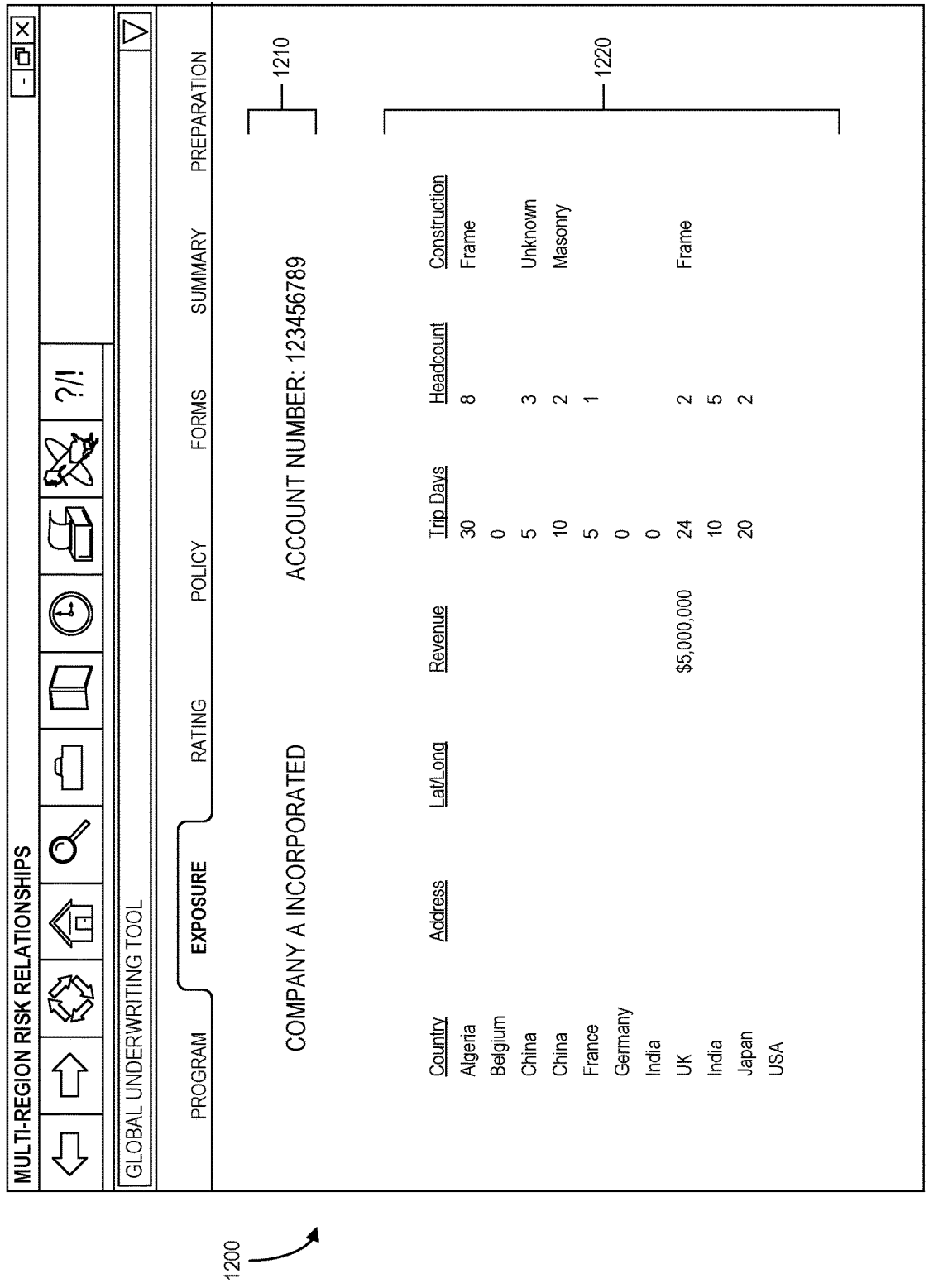
FIG. 12 is a location exposure display in accordance with some embodiments.

FIG. 12 is a location exposure display 1200 that can be used to enter location exposure data in accordance with some embodiments. The display 1200 includes a program overview 1210 along with exposure data 1220, such as a country identifier, address data, latitude and longitude data (e.g., which might be automatically populated based on the address or vice versa), revenue or sales information, trip day values (e.g., for employees, students, volunteers, etc.), headcount values (e.g., for locals, US nationals, etc.), construction information, industry hazard data, etc.

Figure 13:
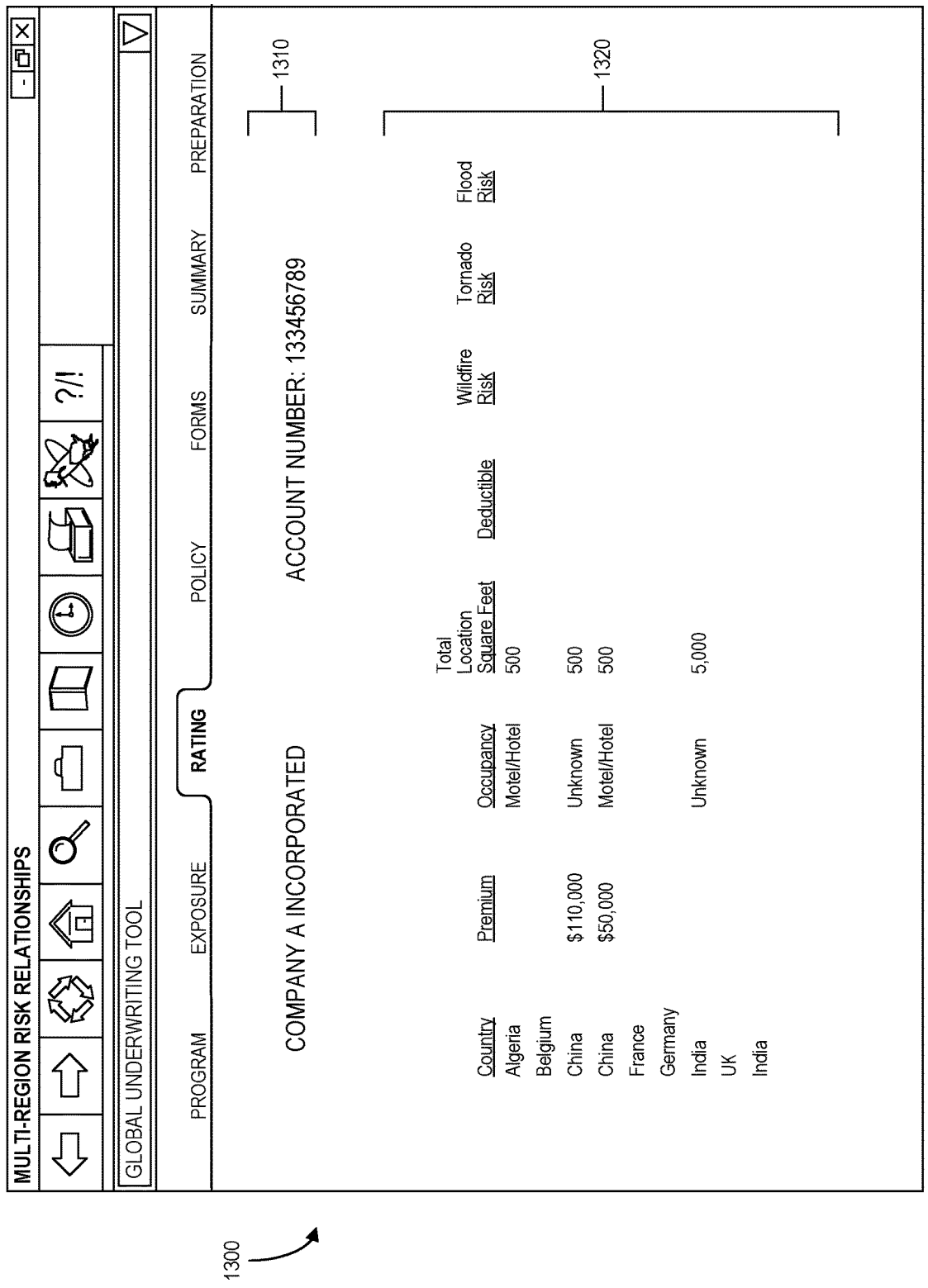
FIG. 13 is a rating information display according to some embodiments.

FIG. 13 is a rating information display 1300 according to some embodiments. The display 1300 includes a program overview 1310 along with rating data 1320, such as a country identifier, total location premium values, occupancy information, exposure information, natural disaster risk information (e.g., a rank associated with wildfire, lightning, hail storm, tornado, river flood, flash flood, storm surge, earthquake, tsunami, volcano, etc.).

FIG. 14 is a policy information display 1400 in accordance with some embodiments. The display 1400 includes a program overview 1410 along with master policy data, additional named insureds, master broker and foreign details, and premium details. For example, the display 1400 might include a master country 1420, coverages 1422, a policy type 1424, an indication of whether a local policy is required 1426, a master number 1428, dates 1430, an insured name 1440, an agency 1444, a contact 1448, an address 1442, a tax identifier 1446, and a form 1450. According to some embodiments, the display 1400 further includes a currency 1460, an exchange rate 1462, and a premium value 1464. An operator may select "Save," "LAP," "Reset" icons 1470 to navigate to other portions of the global underwriting tool.

Figure 15:
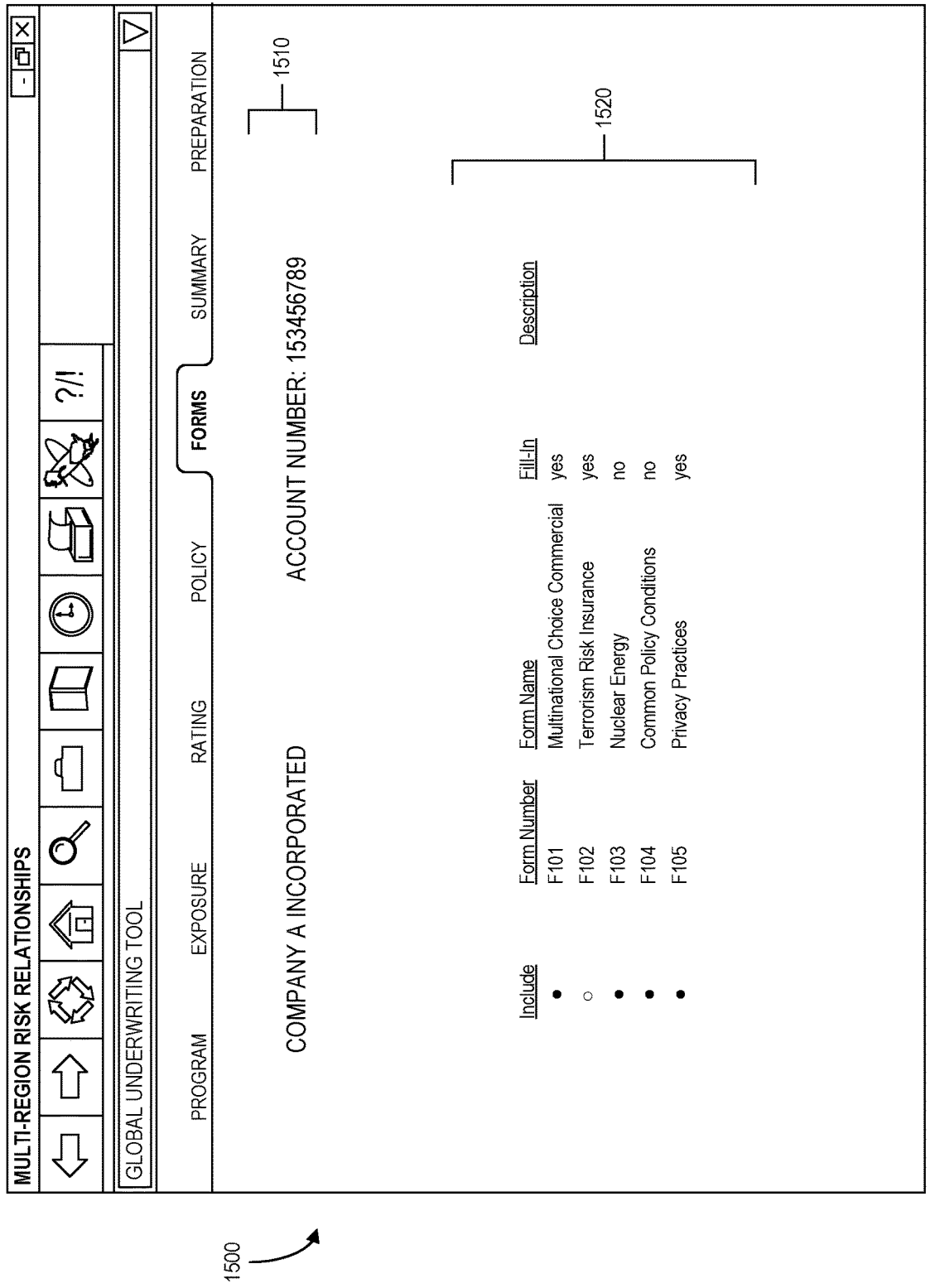
FIG. 15 is a forms selection display according to some embodiments.

FIG. 15 is a forms selection display 1500 that lets you select forms for a program according to some embodiments. The display 1500 includes a program overview 1510 along with a form search area 1520 that includes a form number, a form name, an indication of whether a form is included, an indication of whether a form can be filled-in with information, a form description, etc. Note that a global underwriting tool might be associated with many different types of forms, such as those associated with general liability insurance: a commercial general liability coverage form; commercial general liability coverage part declarations; employee benefits liability coverage part declarations, etc. Other examples might include an employer's responsibility coverage form, employer's responsibility coverage part declarations, an exclusion for terrorism or communicable disease, form inserts, a business auto coverage form, forms and endorsement declarations, a nuclear energy liability exclusion, business auto coverage part declarations, a policy changes endorsement, persons or organizations designated as named insureds, professional services not covered, etc.

Figure 16:
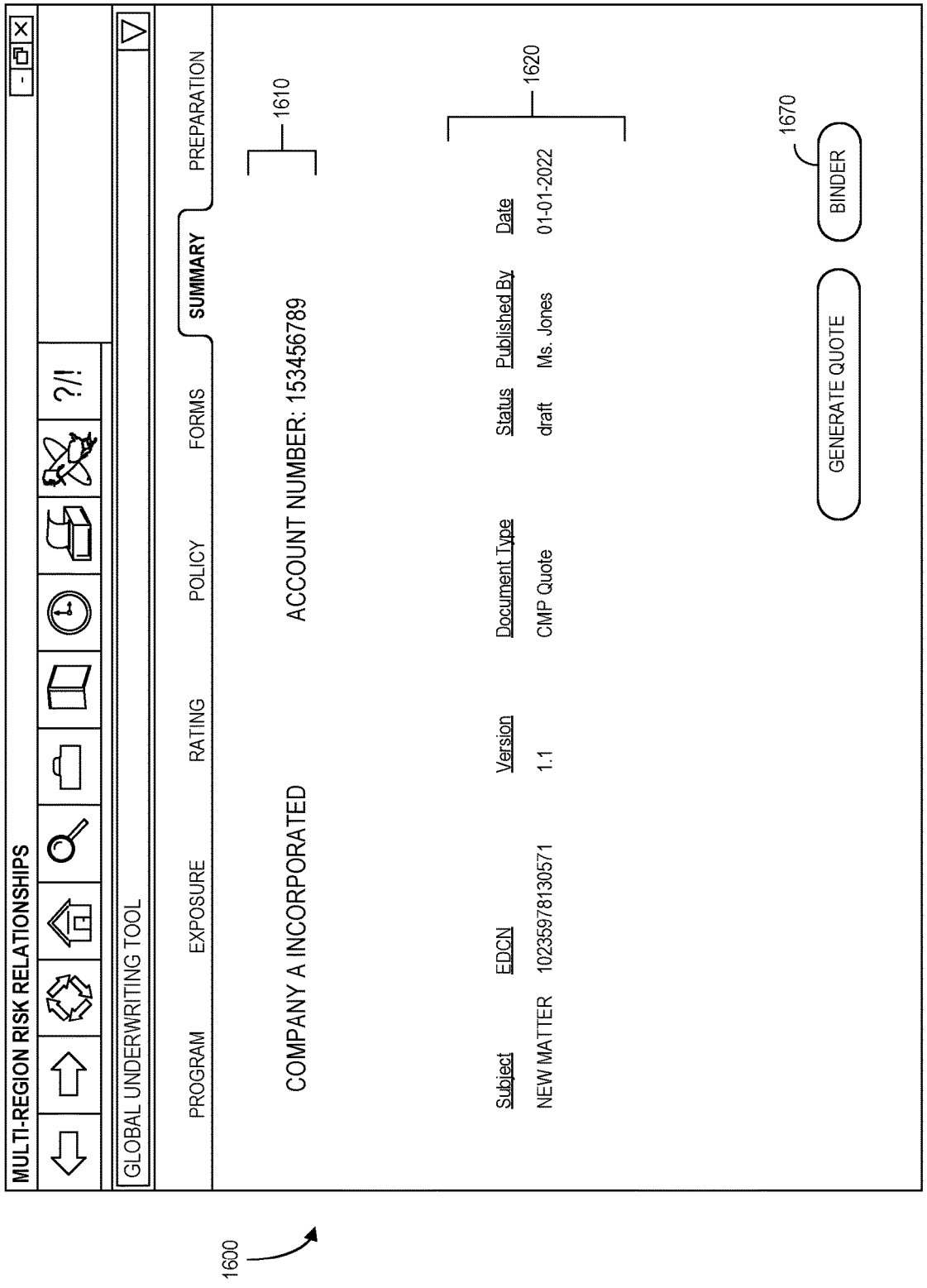
FIG. 16 is a final policy summary display in accordance with some embodiments.

FIG. 16 is a final policy summary display 1600 in accordance with some embodiments. The display 1600 includes a program overview 1610 along with summary data 1620, such as a subject, an Electronic Document Control Number ("EDCN"), a version, a document type, a status, a "published by" indication, and a publication date. An operator might select to "Generate Quote" or to create a "Binder" 1670. FIGS. 17A through 17C are final policy preparation displays 1710, 1720, 1730 according to some embodiments. These displays 1710, 1720, 1730 might include summary information 1712, quote proposal information, binder data, coding sheets, network instructions, etc. For example, FIG. 17A illustrates policy details 1714 and premium information 1716. FIG. 17B illustrates summary information 1722 along with account information 1724 and country-specific information 1726. FIG. 17C illustrates network instructions 1732, including a policy number, group number (including a Freedom Of Service ("FOS") group number for European countries), country, coverage, named insured, etc.

Figure 18:
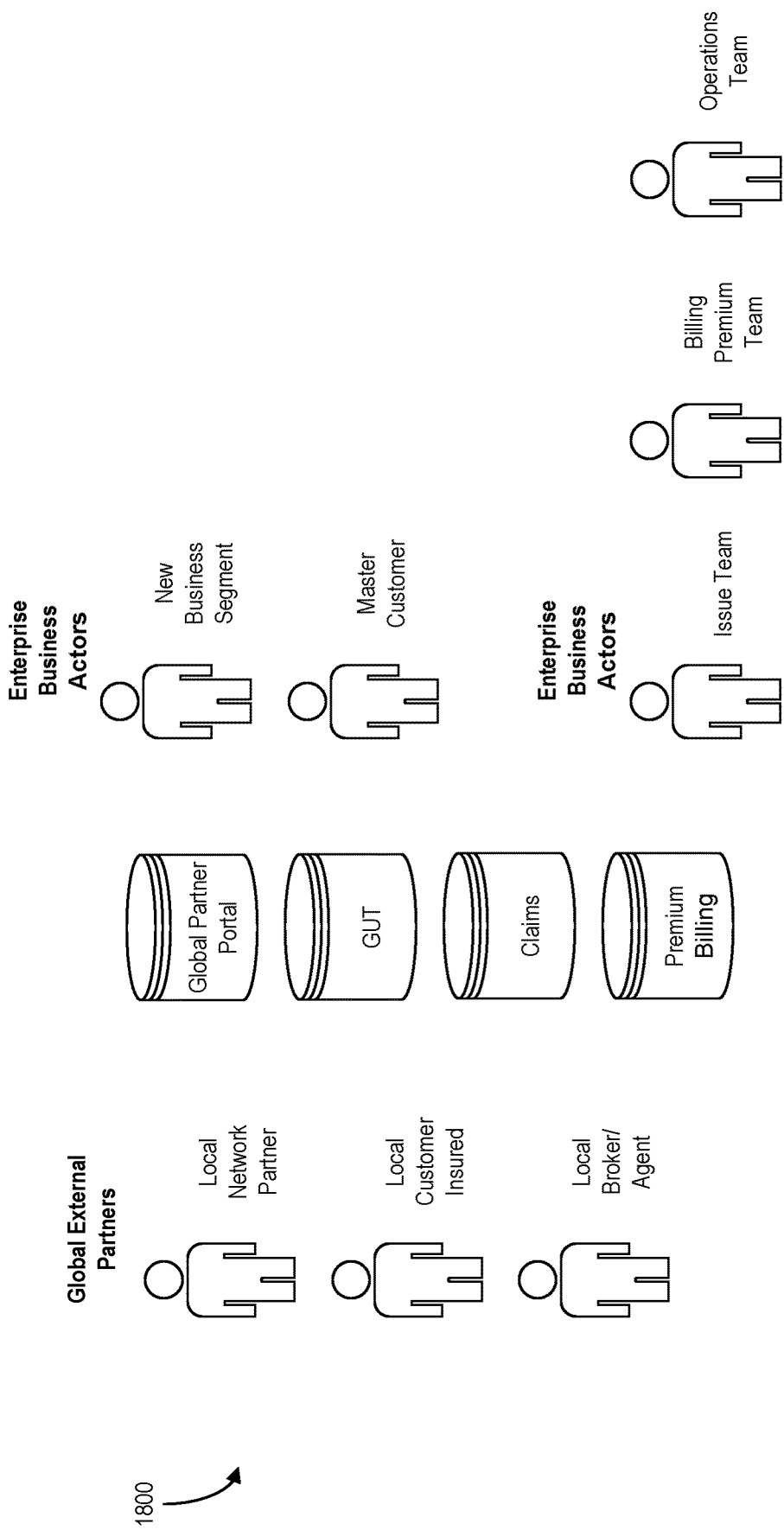
FIG. 18 illustrates enterprise roles in accordance with some embodiments.

FIG. 18 illustrates enterprise "roles" 1800 in accordance with some embodiments. Note that within an organization, "roles" may be created for various job functions. The permissions to perform certain operations may be assigned to specific roles. Employees (or other system users) are assigned particular roles, and through those role assignments acquire the permissions needed to perform particular system functions. Since users are not assigned permissions directly, but only acquire them through their role (or roles), management of individual user rights becomes a matter of assigning appropriate roles to the user's account. As illustrated in FIG. 18, global external partners may include a local network partner, a local customer insured, and local broker or agent. These parties may populate data stores for a global partner portal, a GUT, a claims system, a premium billing system, etc. Other roles include enterprise business actors, such as a new business segment or master customer, and enterprise business actors (e.g., an issue team, a billing premium team, an operations team, etc.).

Figure 19:
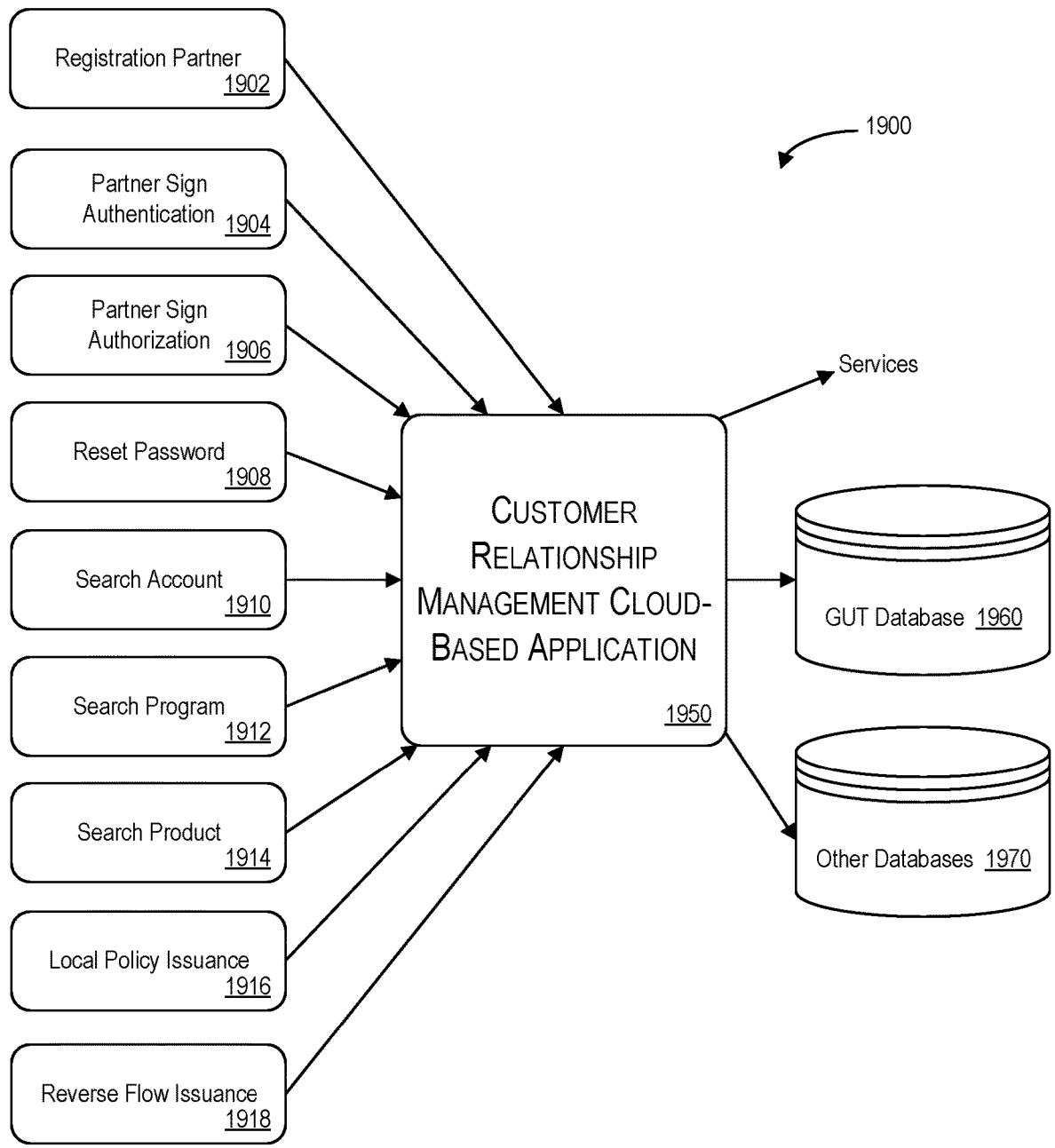
FIG. 19 illustrates a customer relationship management cloud-based system according to some embodiments.

FIG. 19 illustrates a Customer Relationship Management ("CRM") cloud-based system 1900 according to some embodiments. In particular, a CRM cloud-based application 1950 might manage a company's interaction with current and potential customers. The application 1950 might use data analysis about customers' history with a company to improve business relationships with customers, focusing on customer retention and ultimately driving sales growth. The application 1950 may compile data from a range of different communication channels, including a website, telephone call, email, live chat, marketing materials, social media, etc. to facilitate partner registration 1902, partner sign authentication 1904, a partner sign authorization 1906, password resets 1908, account searches 1910, program searches 1912, product searches 1914, local policy issuance 1916 (e.g., when a master US insurance policy requires instructions to be sent to foreign insurance partners requesting that local policies be established), and reverse flow issuance 1918 (e.g., when a master foreign insurance policy requests that a local US policy be established). Results may be stored into a GUT database 1960 and/or other databases 1970.

Figure 20:
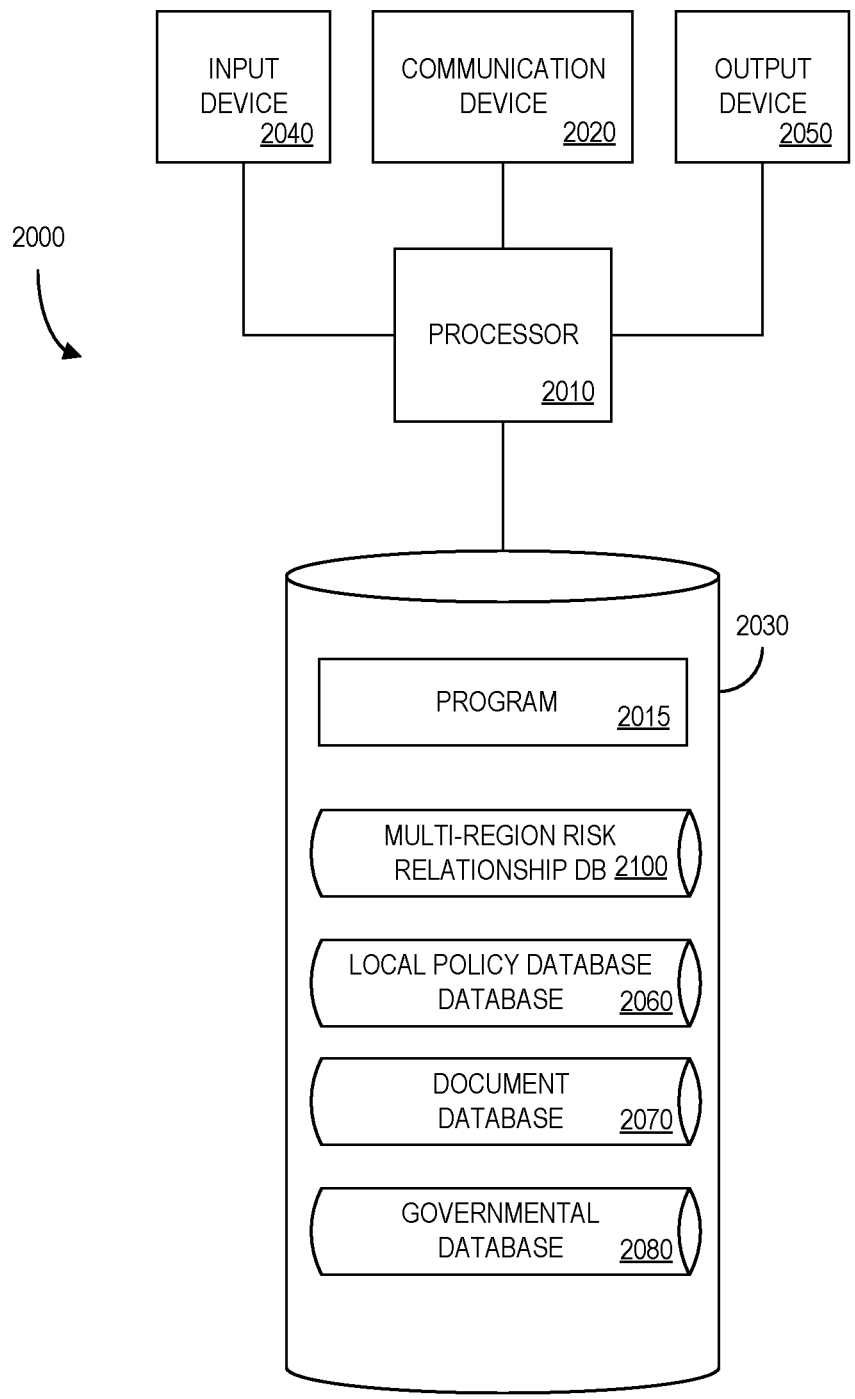
FIG. 20 is a block diagram of an apparatus in accordance with some embodiments of the present invention.

The embodiments described herein may be implemented using any number of different hardware configurations. For example, FIG. 20 illustrates an apparatus 2000 that may be, for example, associated with the systems 100, 300 described with respect to FIGS. 1 and 3, respectively. The apparatus 2000 comprises a processor 2010, such as one or more commercially available Central Processing Units ("CPUs") in the form of one-chip microprocessors, coupled to a communication device 2020 configured to communicate via a communication network (not shown in FIG. 20). The communication device 2020 may be used to communicate, for example, with one or more remote administrator computers and or communication devices (e.g., PCs and smartphones). Note that communications exchanged via the communication device 2020 may utilize security features, such as those between a public internet user and an internal network of the insurance enterprise. The security features might be associated with, for example, web servers, firewalls, and/or PCI infrastructure. The apparatus 2000 further includes an input device 2040 (e.g., a mouse and/or keyboard to enter information about a standalone risk calculation unit) and an output device 2050 (e.g., to output reports regarding insurance documents).

The processor 2010 also communicates with a storage device 2030. The storage device 2030 may comprise any appropriate information storage device, including combinations of magnetic storage devices (e.g., a hard disk drive), optical storage devices, mobile telephones, and/or semiconductor memory devices. The storage device 2030 stores a program 2015 and/or a risk evaluation tool or application for controlling the processor 2010. The processor 2010 performs instructions of the program 2015, and thereby operates in accordance with any of the embodiments described herein. For example, the processor 2010 may access a multi-region risk relationship database 2100 that contains electronic records representing a plurality of multi-region risk relationships and, for each multi-region risk relationship, an electronic record identifier and a set of multi-region attribute values including a plurality of hierarchical local risk relationship attribute values. The processor 2010 may receive an indication of a selected risk relationship and display at least some of the associated multi-region attribute values. The processor 2010 may receive adjustments to some of the multi-region attribute values, and displayed information may be automatically and dynamically configured based on the received adjustments and a standalone risk calculation unit. When adjustments have been completed, the processor 2010 may automatically assemble a multi-region risk relationship document.

The program 2015 may be stored in a compressed, uncompiled and/or encrypted format. The program 2015 may furthermore include other program elements, such as an operating system, a database management system, and/or device drivers used by the processor 2010 to interface with peripheral devices.

As used herein, information may be "received" by or "transmitted" to, for example: (i) the back-end application computer server 2000 from another device; or (ii) a software application or module within the back-end application computer server 2000 from another software application, module, or any other source.

In some embodiments (such as shown in FIG. 20), the storage device 2030 further stores the multi-region risk relationship database 2100, a third-party database 2060 (e.g., storing a list of business address and phone numbers that may be used to pre-populate fields on a document creation web site), a document database 2070 (e.g., storing documents from which employee names or salary data might be extracted), and a governmental database 2080 (e.g., storing motor vehicle records, tax information, etc.). An example of a database that might be used in connection with the apparatus 2000 will now be described in detail with respect to FIG. 21. Note that the database described herein is only an example, and additional and/or different information may be stored therein. Moreover, various databases might be split or combined in accordance with any of the embodiments described herein. For example, the multi-region risk relationship database 2100 and document database 2070 might be combined and/or linked to each other within the program 2015.

Referring to FIG. 21, a table is shown that represents the multi-region risk relation database 2100 that may be stored at the apparatus 2100 according to some embodiments. The table may include, for example, entries associated with insurance policies for which a document creation process may be performed. The table may also define fields 2102, 2104, 2106, 2108, 2110 for each of the entries. The fields 2102, 2104, 2106, 2108, 2110 may, according to some embodiments, specify: a master policy identifier 2102, a customer name 2104, local policies 2106, a final document 2108, and a multi-region premium value 2110. The multi-region risk relation database 2100 may be created and updated, for example, based on information electrically received from various computer systems, including those associated with a multi-region insurance customer.

The master policy identifier 2102 may be, for example, a unique alphanumeric code identifying an insurance policy that might be associated with a number of local policies (as described in connection with FIG. 4). The customer name 2104 might be the insured and the local policies 2106 might contain, or link to, associated insurance policies in other countries. The final document 2108 might contain or point to an insurance policy that was automatically assembled based on the master 2102 and local policies 2106. The multi-region premium value 2110 might be based at least in part on results from a standalone risk calculation unit.

Thus, embodiments may provide an automated and efficient way to facilitate the creation of multi-region electronic record information and documents in a way that provides faster, more accurate results. Embodiments may also address the need for automation (geocoding, forms, coding sheets, etc.) to address missing business requirement and allow for improved system integration. Embodiments may also facilitate data validation, business intelligence, Role-Based Access Control ("RBAC"), continuous integration and deployment, version control, and other technical capabilities provided by more advanced technologies. Moreover, a simplified reporting capability may be provided for multinational actuaries by combining web application data (with a small number of alternate sources) into a single, centralized area. Embodiments may also reduce manual effort and improve data preparation time.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 22:
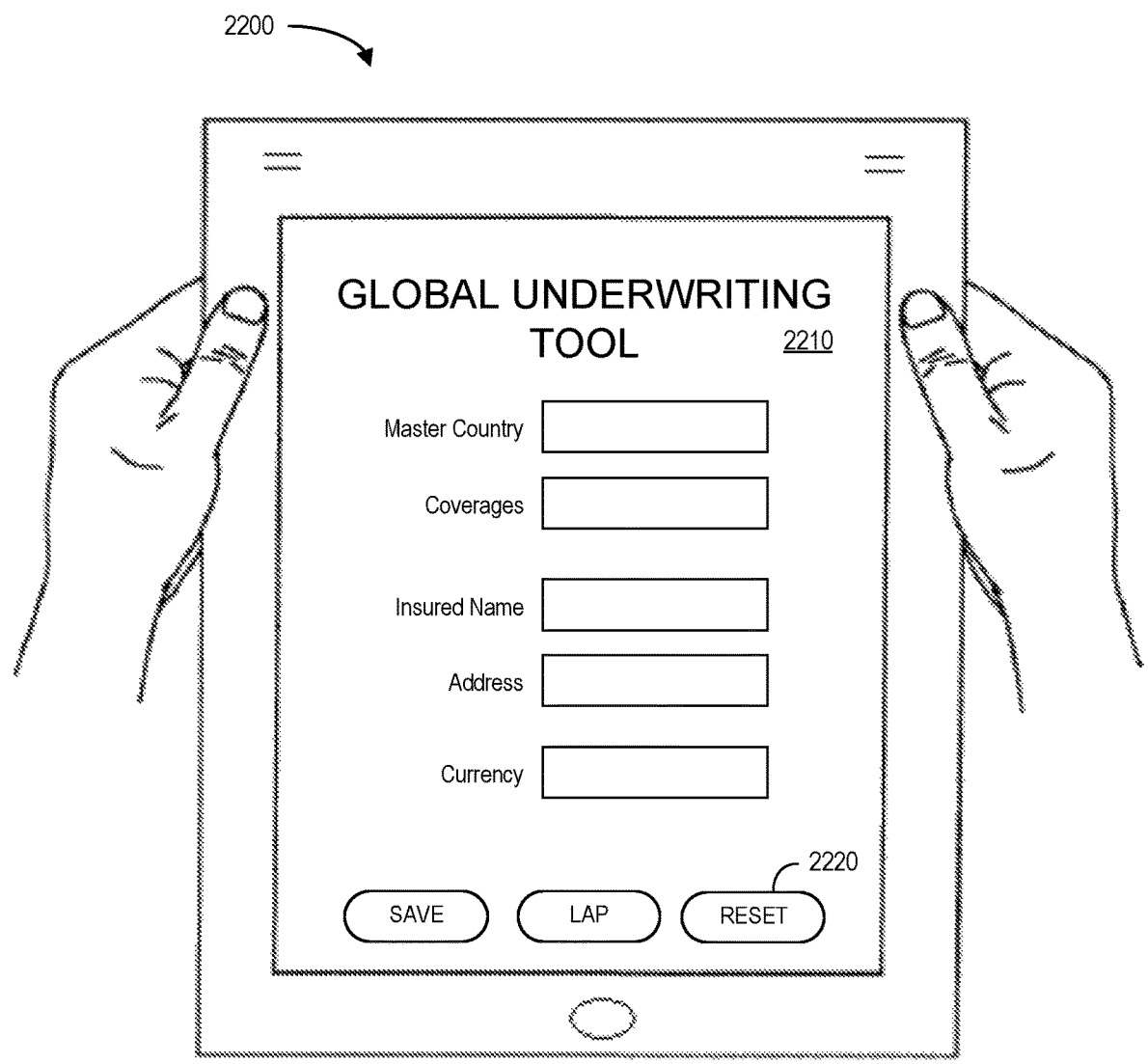
FIG. 22 illustrates a tablet computer displaying a resource allocation user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., business insurance policies, automobile insurance policies, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 22 illustrates a handheld tablet computer 2200 showing a GUT display 2210 according to some embodiments. The GUT display 2210 might include user-selectable data that can be selected and/or modified by a user of the handheld computer 2200 to provide updated multi-region insurance information to an insurance enterprise.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to facilitate the creation of multi-region electronic record information via a back-end application computer server of an enterprise, comprising:
   (a) a multi-region risk relationship data store containing electronic records representing a plurality of multi-region risk relationships with the enterprise and, for each multi-region risk relationship, an electronic record identifier and a set of multi-region attribute values including a plurality of hierarchical local risk relationship attribute values;
   (b) the back-end application computer server, coupled to the multi-region risk relationship data store, including:
      a computer processor, and
      a computer memory, coupled to the computer processor, storing instructions, that when executed by the computer processor cause the back-end application computer server to:
         (i) receive an indication of a selected risk relationship, between the enterprise and an entity, from the multi-region risk relationship data store, including the associated set of multi-region attribute values,
         (ii) arrange to display at least some of the multi-region attribute values on an interactive user interface display,
         (iii) receive, from a remote user device, an adjustment to at least one of the multi-region attribute values, wherein the information on the interactive user interface display is automatically and dynamically configured based on the received adjustment and a standalone risk calculation unit,
         (iv) arrange for at least some local risk relationship attribute values to be automatically replicated for multiple regions,
         (v) upload an attachment file from the remote user device,
         (vi) automatically supplement information from the multi-region risk relationship data store with values automatically extracted from the attachment file to reduce a number of computer network messages exchanged by the back-end application computer server,
         (vii) receive, from the remote user device, an indication that the adjustment has been completed,
         (viii) responsive to the received indication, automatically assemble a multi-region risk relationship document in accordance with at least one of the hierarchical local risk relationship attribute values, and
         (ix) transmit an indication of the assembled multi-region risk relationship document to the remote user device; and
   (c) a communication port coupled to the back-end application computer server to facilitate an exchange of data with the remote user device to support the interactive user interface display via a distributed communication network.

2. The system of claim 1, wherein each region is associated with a different country.

3. The system of claim 2, wherein the interactive user interface display includes a dashboard display with at least one of: (i) an open program indication, (ii) a controlled master program indication, (iii) a package program indication, (iv) a master and local policy indication, (v) a program status chart, (vi) a line of business chart, (vii) a master and local policy chart, and (viii) program chronological data.

4. The system of claim 2, wherein the interactive user interface display includes a search display with: (i) an account search, (ii) a program search, and (iii) a policy search.

5. The system of claim 2, wherein the multi-region risk relationships are associated with insurance policies.

6. The system of claim 5, wherein the interactive user interface display includes a program setup display with at least one of: (i) a program identifier, (ii) an industry code, (iii) a list of insurance coverages, (iv) a list of countries, (v) an effective and expiration date, (vi) a business type, (vii) first named insured information, (viii) agency details, (ix) underwriter details, and (x) account manager and underwriter details.

7. The system of claim 5, wherein the interactive user interface display includes a location exposure display with at least one of: (i) a country identifier, (ii) address data, (iii) latitude and longitude data, (iv) revenue or sales information, (v) trip day values, (vi) headcount values, (vii) construction information, and (viii) industry hazard data.

8. The system of claim 5, wherein the interactive user interface display includes a rating information display with at least one of: (i) a country identifier, (ii) total location premium values, (iii) occupancy information, (iv) exposure information, and (v) natural disaster risk information.

9. The system of claim 5, wherein the interactive user interface display includes a policy information display with at least one of: (i) master policy data, (ii) additional named insureds, (iii) master broker and foreign details, and (iv) premium details.

10. The system of claim 5, wherein the interactive user interface display includes a forms selection display with at least one of: (i) a form number, (ii) a form name, (iii) an indication of whether a form is included, (iv) an indication of whether a form can be filled-in with information, and (v) a form description.

11. The system of claim 5, wherein the interactive user interface display includes a final policy preparation display with at least one of: (i) summary information, (ii) quote proposal information, (iii) binder data, (iv) coding sheets, and (v) network instructions.

12. The system of claim 2, wherein information from the multi-region risk relationship data store is supplemented with at least one of: (i) third-party data, (ii) governmental data, (iii) document data, (iv) credit score data, (v) premium data, (vi) account information, and (vii) region details.

13. A computerized method to facilitate the creation of multi-region electronic record information via a back-end application computer server of an enterprise, comprising:
   accessing, by a computer processor of the back-end application computer server, a multi-region risk relationship data store containing electronic records representing a plurality of multi-region risk relationships with the enterprise and, for each multi-region risk relationship, an electronic record identifier and a set of multi-region attribute values including a plurality of hierarchical local risk relationship attribute values;
   receiving an indication of a selected risk relationship, between the enterprise and an entity, from the multi-region risk relationship data store, including the associated set of multi-region attribute values;
   arranging to display at least some of the multi-region attribute values on an interactive user interface display;
   receiving, from a remote user device, an adjust adjustment to at least one of the multi-region attribute values, wherein the information on the interactive user interface display is automatically and dynamically configured based on the received adjustment and a standalone risk calculation unit;
   arranging for at least some local risk relationship attribute values to be automatically replicated for multiple regions;
   automatically uploading an attachment file from the remote user device;
   automatically supplementing information from the multi-region risk relationship data store with values automatically extracted from the attachment file to reduce a number of computer network messages exchanged by the back-end application computer server;
   receiving, from the remote user device, an indication that the adjustment has been completed;
   responsive to the received indication, automatically assembling a multi-region risk relationship document in accordance with at least one of the hierarchical local risk relationship attribute values; and
   transmitting an indication of the assembled multi-region risk relationship document to the remote user device.

14. The method of claim 13, wherein each region is associated with a different country.

15. The method of claim 14, wherein the interactive user interface display includes a dashboard display with at least one of: (i) an open program indication, (ii) a controlled master program indication, (iii) a package program indication, (iv) a master and local policy indication, (v) a program status chart, (vi) a line of business chart, (vii) a master and local policy chart, and (viii) program chronological data.

16. The method of claim 14, wherein the interactive user interface display includes a search display with at least one of: (i) an account search, (ii) a program search, and (iii) a policy search.

17. The method of claim 14, wherein the multi-region risk relationships are associated with insurance policies.

18. A non-transitory, computer-readable medium storing instructions, that, when executed by a processor, cause the processor to perform a method to facilitate the creation of multi-region electronic record information via a back-end application computer server of an enterprise, the method comprising:
   accessing, by a computer processor of the back-end application computer server, a multi-region risk relationship data store containing electronic records representing a plurality of multi-region risk relationships with the enterprise and, for each multi-region risk relationship, an electronic record identifier and a set of multi-region attribute values including a plurality of hierarchical local risk relationship attribute values;
   receiving an indication of a selected risk relationship, between the enterprise and an entity, from the multi-region risk relationship data store, including the associated set of multi-region attribute values;
   arranging to display at least some of the multi-region attribute values on an interactive user interface display;
   receiving, from a remote user device, an adjustment to at least one of the multi-region attribute values, wherein the information on the interactive user interface display is automatically and dynamically configured based on the received adjustment and a standalone risk calculation unit;
   arranging for at least some local risk relationship attribute values to be automatically replicated for multiple regions;
   automatically uploading an attachment file from the remote user device;
   automatically supplementing information from the multi-region risk relationship data store with values automatically extracted from the attachment file to reduce a number of computer network messages exchanged by the back-end application computer server;
   receiving, from the remote user device, an indication that the adjustment has been completed;
   responsive to the received indication, automatically assembling a multi-region risk relationship document in accordance with at least one of the hierarchical local risk relationship attribute values; and
   transmitting an indication of the assembled multi-region risk relationship document to the remote user device.

19. The medium of claim 18, wherein each region is associated with a different country.

20. The medium of claim 18, wherein the interactive user interface display includes a dashboard display with at least one of: (i) an open program indication, (ii) a controlled master program indication, (iii) a package program indication, (iv) a master and local policy indication, (v) a program status chart, (vi) a line of business chart, (vii) a master and local policy chart, and (viii) program chronological data.

* * * * *